(12) United States Patent
Fujisawa et al.

(10) Patent No.: US 9,823,144 B2
(45) Date of Patent: Nov. 21, 2017

(54) LOAD SENSOR

(71) Applicant: MINEBEA CO., LTD., Kitasaku-gun, Nagano (JP)

(72) Inventors: Shinichi Fujisawa, Akiruno (JP); Eiji Misaizu, Yokohama (JP); Satoshi Ogawa, Fujisawa (JP)

(73) Assignee: Minebea Co., Ltd., Nagano (JP)

( * ) Notice: Subject to any disclaimer, the term of this patent is extended or adjusted under 35 U.S.C. 154(b) by 303 days.

(21) Appl. No.: 14/559,151

(22) Filed: Dec. 3, 2014

(65) Prior Publication Data
US 2015/0160080 A1    Jun. 11, 2015

(30) Foreign Application Priority Data

Dec. 6, 2013  (JP) .................. 2013-253455

(51) Int. Cl.
*G01L 1/26* (2006.01)
*G01L 1/22* (2006.01)

(52) U.S. Cl.
CPC .............. *G01L 1/26* (2013.01); *G01L 1/2231* (2013.01)

(58) Field of Classification Search
CPC .................................... G01L 1/04; G01L 1/22
USPC ...... 73/862.044, 862.045, 862.338, 862.474, 73/862.627
See application file for complete search history.

(56) References Cited

U.S. PATENT DOCUMENTS

| | | | | | |
|---|---|---|---|---|---|
| 4,777,831 | A | * | 10/1988 | Masuda | G01L 1/2262 413/27 |
| 5,092,645 | A | * | 3/1992 | Okada | B25J 13/085 294/119.1 |
| 6,005,199 | A | * | 12/1999 | Harada | G01L 1/2231 177/211 |
| 2004/0083825 | A1 | * | 5/2004 | Tsutaya | G01G 3/14 73/862.474 |

FOREIGN PATENT DOCUMENTS

| JP | S3923167 | | 10/1939 |
|---|---|---|---|
| JP | S57186125 | A | 11/1982 |
| JP | 61-278719 | A | 12/1986 |
| JP | 2000146716 | A | 5/2000 |
| JP | 2000-214002 | A | 8/2000 |

OTHER PUBLICATIONS

Office Action dated Oct. 26, 2016 in the corresponding Japanese Patent Application No. 2013-253455.

\* cited by examiner

*Primary Examiner* — David M Gray
*Assistant Examiner* — Andrew V Do
(74) *Attorney, Agent, or Firm* — Carrier Blackman & Associates, P.C.; Joseph P. Carrier; Jeffrey T. Gedeon

(57) ABSTRACT

There is provided a load sensor including: a pressing shaft configured to transmit a load in an axial direction of the pressing shaft; a sensor element configured to measure the load being transmitted by the pressing shaft; and a load limiting means configured to limit the load applied to the sensor element and protect the sensor element from being applied with excessive load, the load limiting means being configured to be deformable by the load when the load transmitted by the pressing shaft exceeds an allowable measurement range set for the sensor element.

7 Claims, 8 Drawing Sheets

LOAD SENSOR

BACKGROUND OF THE INVENTION

1. Field of the Invention

The present invention relates to a load sensor that measures a load acting in one axial direction.

2. Description of the Related Art

Conventionally, there have been known load sensors for measuring a load (a pressing force) acting in one axial direction (for example, a Z-axis direction in an orthogonal coordinate system). Examples of such load sensors are disclosed in JP-A-61-278719 and in JP-A-2000-214002. A load sensor disclosed in JP-A-61-278719 is configured as a top loading balance using a coil spring as a cushioning member. In this load sensor, a stopper is provided on the bottom of a shaft, and the diameter of a through-hole of a case is adjusted for the shaft, whereby a measure against cases where the load sensor receives an eccentric load or an impact in a direction other than a vertical direction is taken. A load sensor disclosed in JP-A- 2000-214002 is configured so as to detect a load in a wide range by two coil springs and two detection elements each made of a magneto resistance element (MR element).

In the configuration of the load sensor disclosed in JP-A-61-278719, a detector is arranged at a portion different from a portion that displaces in response to a load. Therefore, the load senor becomes large, and it is difficult to reduce the size of the entire load senor. Also, since a pan is configured to be large, a shaft should be formed to be long enough with respect to an eccentric load, this load sensor is not suitable for reducing the overall size.

Also, in the configuration of the load sensor disclosed in JP-A-2000-214002, since the coil springs are configured in two stages, the entire load sensor becomes large. Further, since the load sensor does not have a configuration for preventing an inclination of an axial direction in which a load to be measured acts, the load may not be measured accurately.

SUMMARY OF THE INVENTION

The present invention has been made in view of the above circumstances, and one of objects of the present invention is to provide a load sensor capable of accurately measuring a load acting in one axial direction while protecting a sensor element. Another object of the present invention is to provide a load sensor capable of reducing the size of the entire configuration and capable of accurately measuring a load acting in one axial direction even if the load sensor is pressed from a direction deviating from the axial direction in which the load acts.

According to an illustrative embodiment of the present invention, there is provided a load sensor including: a pressing shaft configured to transmit a load in an axial direction of the pressing shaft; a sensor element configured to measure the load being transmitted by the pressing shaft; and a load limiting means configured to limit the load applied to the sensor element and protect the sensor element from being applied with excessive load, the load limiting means being configured to be deformable by the load when the load transmitted by the pressing shaft exceeds an allowable measurement range set for the sensor element.

According to the present invention, it is possible to provide a load sensor capable of accurately measuring a load acting in one axial direction while protecting a sensor element. Further, it is possible to provide a load sensor capable of reducing the size of the entire configuration and capable of accurately measuring a load (a pressing force) acting in one axial direction even if the load sensor is pressed from a direction deviating from the axial direction in which the load acts.

DETAILED DESCRIPTION

Figure 1:
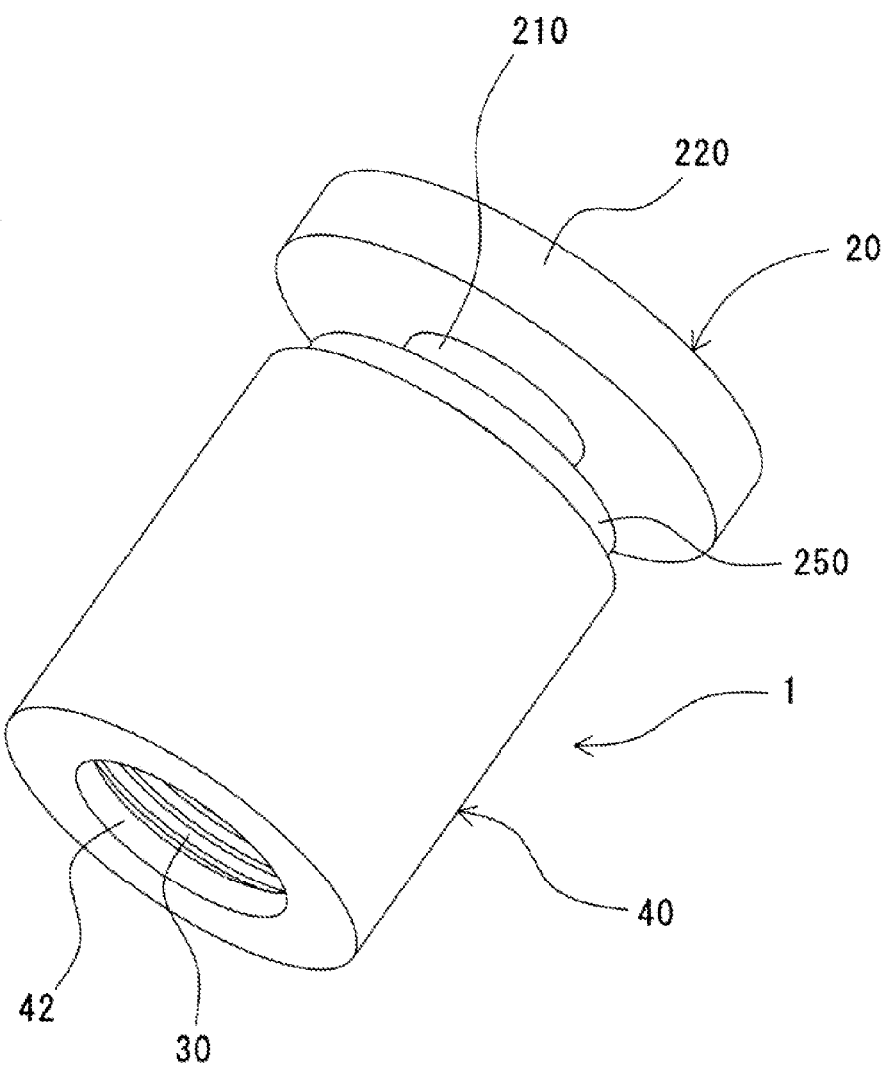
FIG. 1 is a perspective view illustrating a load sensor according to an embodiment of the present invention.
Figure 2:
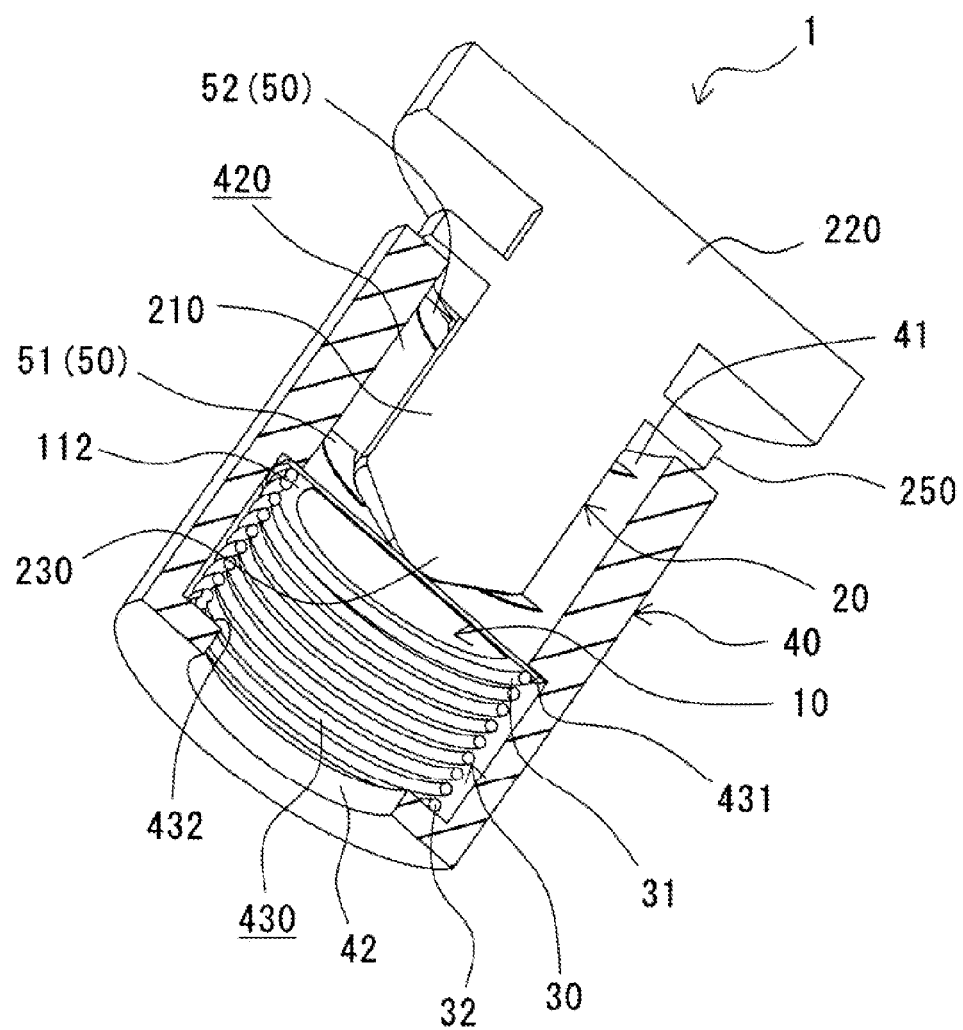
FIG. 2 is a perspective view illustrating a cross section obtained by cutting the load sensor of FIG. 1 along the longitudinal axis of the load sensor.
Figure 3:
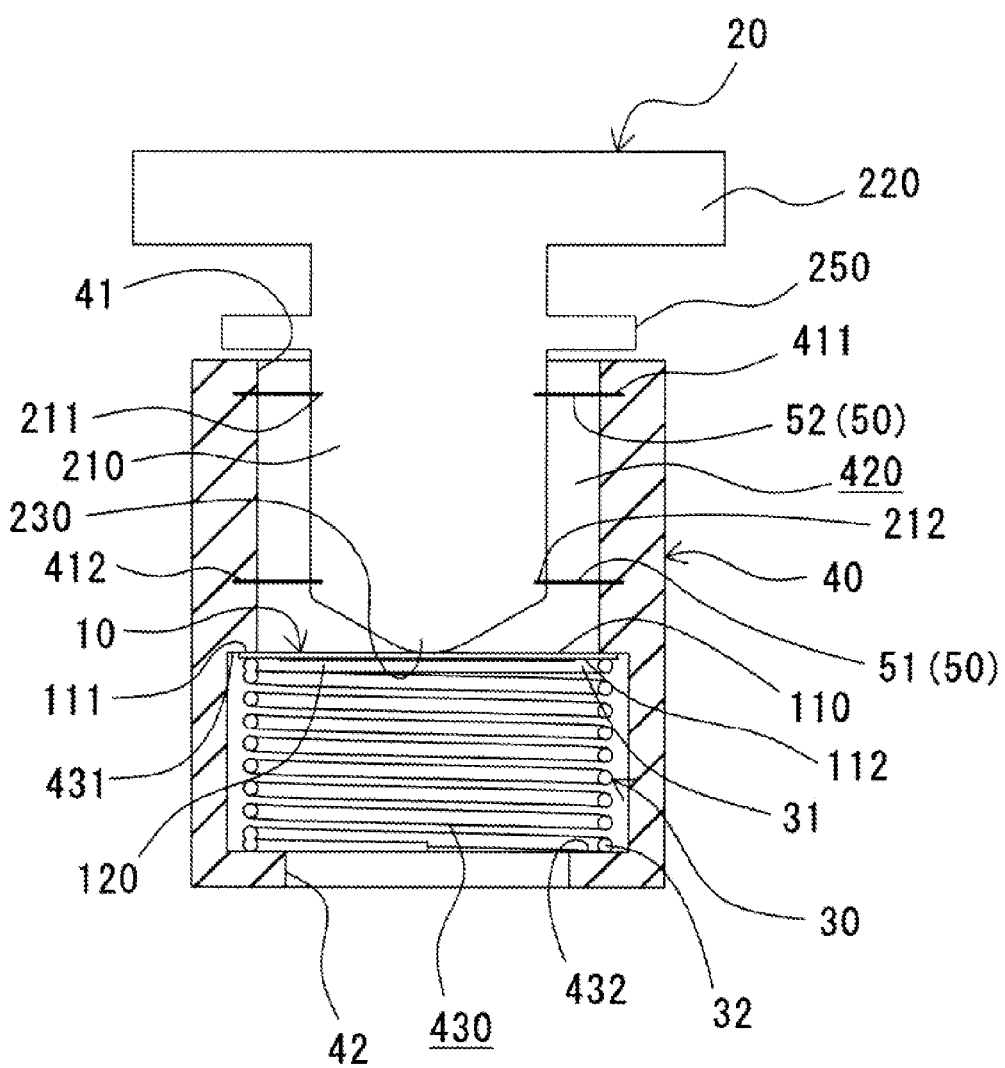
FIG. 3 is a cross-sectional view corresponding to FIG. 2.

Hereinafter, a load sensor according to an embodiment of the present invention will be described with reference to the accompanying drawings. FIG. 1 is a perspective view illustrating the load sensor according to the embodiment of the present invention. FIG. 2 is a perspective view illustrating a cross section obtained by cutting the load sensor of FIG. 1 along the longitudinal axis of the load sensor. FIG. 3 is a cross-sectional view corresponding to FIG. 2.

A load sensor 1 according to the embodiment of the present invention is configured as a load sensor that measures a load by pressing a sensor element 10 with a pressing shaft 20, and includes the pressing shaft 20 that transmits a load applied to the load sensor, in one axial direction, the sensor element 10 that measures the load through the pressing shaft 20, a load limiting means that protects the sensor element 10, and a support case (support body) 40 that supports the sensor element 10, the load limiting means, and the pressing shaft 20 in a predetermined arrangement state.

Hereinafter, the individual components configuring the load sensor 1 will be described in detail. The sensor element 10 is provided with an elastic body 110 and strain gages 120. The elastic body 110 is made of a metal in a thin plate shape, and the tip of the pressing shaft 20 is pressed against one surface (the upper surface in FIGS. 2 and 3) of the elastic body 110 while the pressing shaft 20 is configured to be able to be spaced apart from the upper surface of the elastic body 110, and on the other surface the lower surface in FIGS. 2 and 3) of the elastic body 110, the strain gages 120 are being attached. The outer area (edge portion 111) of the elastic body 110 having the strain gages 120 attached thereon abuts on one end portion (the upper end portion in FIG. 2) 31 of a coil spring 30 that is configured to serve as the load limiting means.

On the other surface of the elastic body 110, an insulating film is formed, and on the insulating film, the strain gages 120 are attached. The strain gages 120 are electrically connected to each other so as to form a Wheatstone bridge circuit. The output of the strain gages 120 is taken out of the load sensor 1 through a flexible printed circuit (FPC) board, which will not be described in detail here.

The coil spring 30 serving as the load limiting means is assembled in a state where the coil spring 30 urges toward the support case 40 (to be described below), and has a spring constant such that in a. case where a load is within the allowable measurement range of the sensor element 10, the load is measured by the sensor element 10, and in a case where a load exceeding the allowable measurement range is applied to the sensor element 10, the coil spring 30 is deformed in the load range corresponding to the excess exceeding the allowable measurement range of the sensor element 10.

The pressing shaft 20 is made of for example, a metal, and includes a shaft body 210 which has a solid rod shape, and a pressure receiving portion 220 which is provided at one end portion of the shaft body 210 and receives a load. Also, at the other end portion of the shaft body 210 of the pressing shaft 20, a gentle tapered portion is formed over the whole of the radial direction such that the center portion of the shaft body becomes the peak having a large curvature radius, and a pressing portion 230 protruding at the center of the tapered portion abuts on the center portion of the one surface (the opposite surface to the surface on which the strain gages 120 have been attached) of the elastic body 110 of the sensor element 10.

On the shaft body 210 of the pressing shaft 20, in the vicinity of the pressure receiving portion 220, a mechanical stopper 250 is formed over the entire circumference of the shaft body 210 so as to be a diameter larger than that of the shaft body 210. The outer diameter of the mechanical stopper 250 is set to be larger than the inner diameter of a shaft side opening portion 41 which belongs to the support case 40 (to be described below) and is for the pressing shaft 20, such that in a case where an excessive load or an impact force is applied to the pressure receiving portion 220, the mechanical stopper 250 bumps into the shaft side opening portion 41, thereby preventing the pressing shaft 20 from further moving toward the sensor element 10. This function may also be implemented by the pressure receiving portion 220 without forming the mechanical stopper. Also, in the present embodiment, between the mechanical stopper 250 and the pressing portion 230 in the longitudinal direction of the shaft body 210, only two leaf spring engagement grooves 211 and 212 (see FIG. 3) are formed over the entire circumference of the shaft body 210 with a predetermined interval.

The support case 40 is made of, for example, a metal, in a cylindrical shape, and a portion of the internal space of the support case 40 from one end portion to a substantially center portion in the longitudinal direction is formed as a shaft insertion space 420 for the shaft body 210 of the pressing shaft 20, and a portion of the internal space from the other end portion to the center portion in the longitudinal direction is formed as a spring accommodating space 430 which accommodates the sensor element 10 and the coil spring 30. The inner circumferential surface of the shaft insertion space 420 and the outer circumferential surface of the shaft body 210 which is inserted into the shaft insertion space 420 are distant from each other to a certain extent, and in the shaft insertion space 420, only two leaf spring engagement grooves 411 and 412 (see FIG. 3) are formed over the entire inner circumferential surface, and between the two leaf spring engagement grooves 411 and 412 and leaf spring engagement grooves 211 and 212 formed over the entire outer circumferential surface of the shaft body 210 and corresponding to the leaf spring engagement grooves 411 and 412 of the shaft insertion space 420, ring-shaped leaf springs 51 and 52 (50) are interposed so as to be engaged with the corresponding grooves. Also, the leaf springs and the engagement grooves do not necessarily need to be provided at two positions.

The elasticity of the leaf springs 50 in the longitudinal direction of the pressing shaft is set so as not to interfere with movement of the pressing shaft 20 in the axial direction of the pressing shaft 20. Also, since the two leaf springs 51 and 52 are formed in a ring shape, the movement direction of the pressing shaft 20 is the same as the axial direction thereof. Further, elastic deformation of the leaf springs 50 causes the shaft body 210 of the pressing shaft 20 inside the shaft insertion space 420 of the support case 40 to move in the central axis direction in a state where the central axis of the shaft body 210 has been aligned with the central axis of the shaft insertion space 420, without receiving resistance from the leaf springs 50. Also, in a case of assembling the load sensor 1, for example, the leaf springs 51 and 52 are engaged with the leaf spring engagement grooves 211 and 212 formed in the shaft body 210 of the pressing shaft 20, respectively, and in this state, the shaft body 210 is inserted from the shaft side opening. portion 41 of the support case 40, whereby the outer circumferential portions of the leaf springs 51 and 52 are engaged with the leaf spring engagement grooves 411 and 412 formed in the shaft insertion space 420 of the support case 40.

The inner diameter of the spring accommodating space 430 of the support case 40 is set to be larger than the inner diameter of the shaft insertion space 420, and be larger than the inner diameter of a spring side opening portion 42 of the spring accommodating space (430) side. Further, between the spring accommodating space 430 and the shaft insertion space 420, a first step portion 431 is formed, and on the side where the spring side opening portion 42 is formed, a second step portion 432 is formed.

The first step portion 431 of the spring accommodating space 430 of the support case 40 abuts on the edge portion 111 of the one surface of the elastic body 110, and an edge portion 112 of the other surface of the elastic body 110 abuts on the one end. portion 31 of the coil spring 30. Also, on the second step portion 432 of the spring accommodating space 430 of the support case 40, the other end portion 32 of the coil spring 30 is set. Also, in a case of assembling the load sensor 1, for example, in work for storing the sensor element 10 and the coil spring 30 in the spring accommodating space 430 of the support case 40, each of the sensor element 10 and the coil spring 30 is deformed with fingers, thereby being reduced in external size, and is inserted into the spring accommodating space 430 through the spring side opening portion 42 of the support case 40.

The pressing shaft 20 is connected to the support case 40 by the leaf springs 50 so as to move in one specific axial direction in response to a load acting on the shaft as described above. The load sensor 1 includes the support case 40 that supports the sensor element 10 and the pressing shaft 20 in the predetermined arrangement state as described above, and the pressing shaft 20 is connected to the support case 40 by the leaf springs 50 so as to move in one specific axial direction in response to a load acting on the shaft. Therefore, it is possible to measure a load by pressing the sensor element 10 with the pressing shaft 20.

Figure 4A:
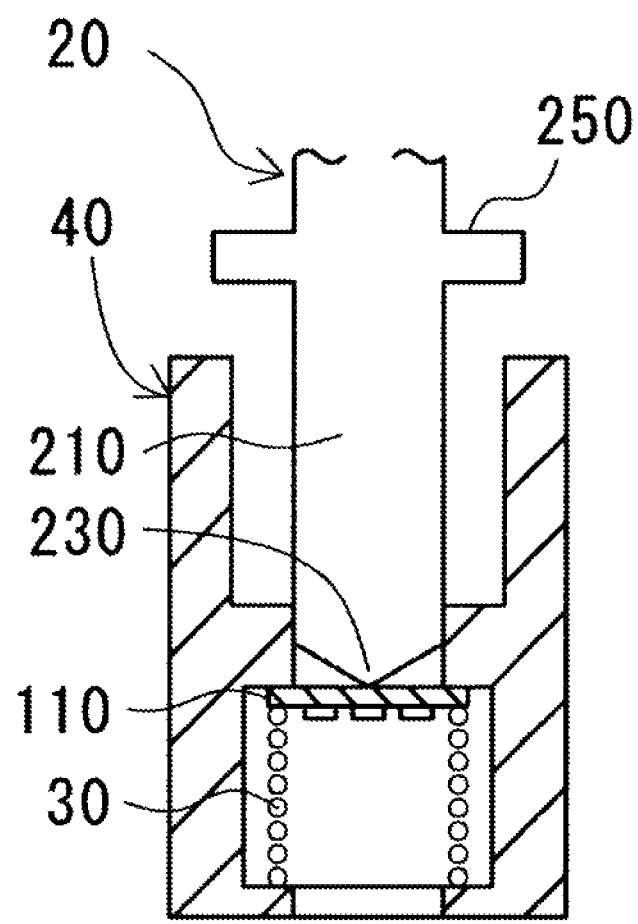
FIGS. 4A to 4D are explanatory views for explaining the action of the load sensor shown in FIG. 1.

Subsequently, function of the load sensor 1 will be described. FIGS. 4A to 4D are explanatory views for explaining the function of the load sensor shown in FIG. 1. FIG. 5 is a characteristic diagram corresponding to FIGS. 4A to 4D for explaining the function of the load sensor 1 shown in FIG. 1. In order to facilitate understanding of the function of the load sensor 1. FIGS. 4A to 4D hyperbolically show the degree of deformation of each component as compared to the degree of actual deformation. In FIG. 5, $K_1$ represents the spring constant of the sensor element 10, and $K_2$ represents the spring constant of the coil spring 30, and b represents the initial load of the coil spring, and δ represents the maximum displacement amount of the pressing shaft 20, that is, the displacement amount of the pressing shaft 20 from when the pressing portion 230 of the pressing shaft 20 comes into contact with the sensor element 10 to when the mechanical stopper 250 bumps into the shaft side opening portion 41 of the support case 40, thereby being stopped.

Hereinafter, changes in the state of the load sensor according to load changes from FIG. 4A to FIG. 4D will be described. FIG. 4A shows a state where no pressing force is being applied on the load sensor 1. This state corresponds to the position of $F_0$ in the horizontal axis of FIG. 5. In this state, the pressing portion 230 which is the tip portion of the pressing shaft 20 is in contact with the elastic body 110 of the sensor element 10.

Figure 4B:
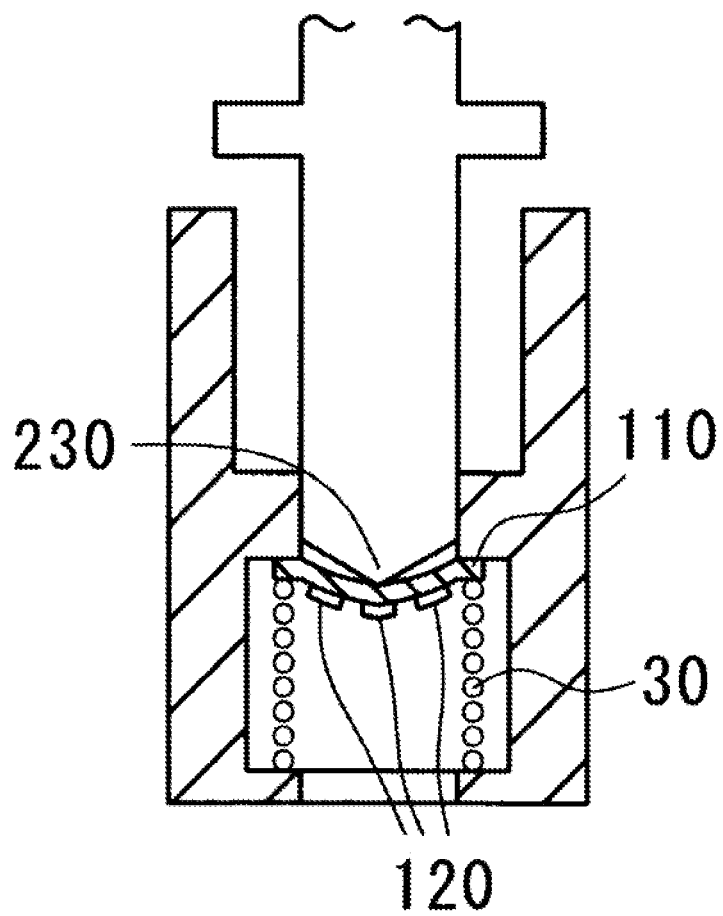
Figure 5:
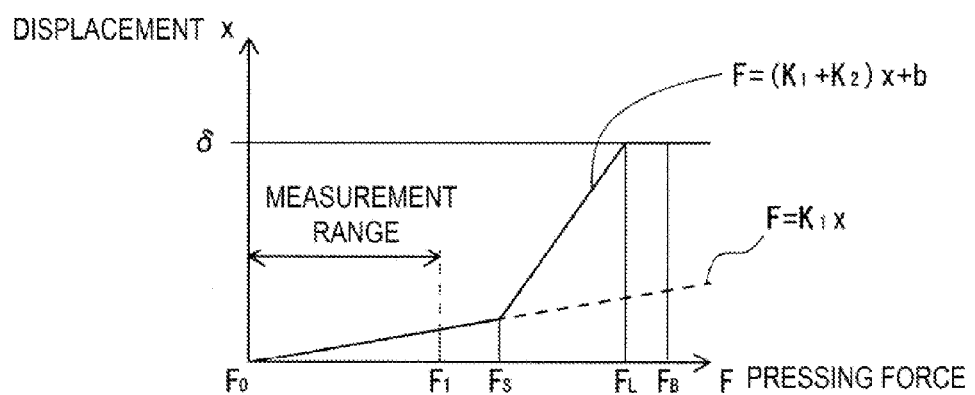
FIG. 5 is a characteristic diagram corresponding to FIGS. 4A to 4D for explaining the action of the load sensor shown in FIG. 1.

If a pressing force is applied to the pressure receiving portion 220 of the pressing shaft 20, as shown in FIG. 4B, in a state where the coil spring 30 is not deformed, the center portion of the elastic body 110 of the sensor element 10 is pressed by the pressing portion 230 of the pressing shaft 20, whereby only the elastic body 110 is deformed, and the pressing force applied to the sensor element 10 is accurately measured by use of a potential difference occurring in the Wheatstone bridge circuit due to a change in the resistance value of the strain gages 120. This state corresponds to a section from the position of $F_0$ to the position of $F_S$ in the horizontal axis of FIG. 5 representing the pressing force F. In FIG. 5, in order to improve the accuracy of measurement, a section from $F_0$ to $F_1$ ($F_1<F_S$) in the allowable measurement range of the sensor element 10 from $F_0$ to $F_s$ has been set as an actual measurement range.

Figure 4C:
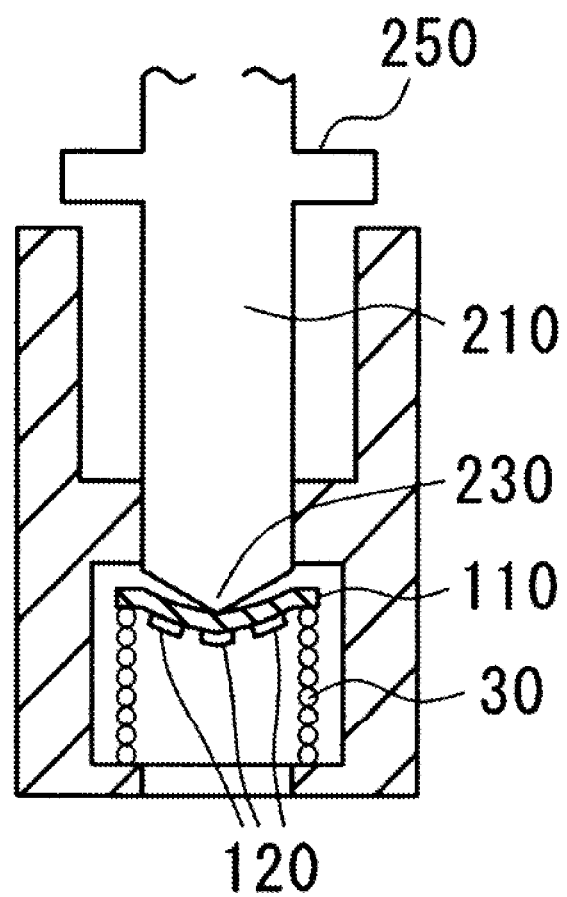

If a pressing force exceeding the allowable measurement range of the sensor element 10 is further applied, as shown in FIG. 4C, the coil spring 30 is urged, thereby being deformed in a load range corresponding to the excess. This state corresponds to a section from $F_S$ to $F_L$ in the horizontal axis of FIG. 5 representing the pressing force F.

Figure 4D:
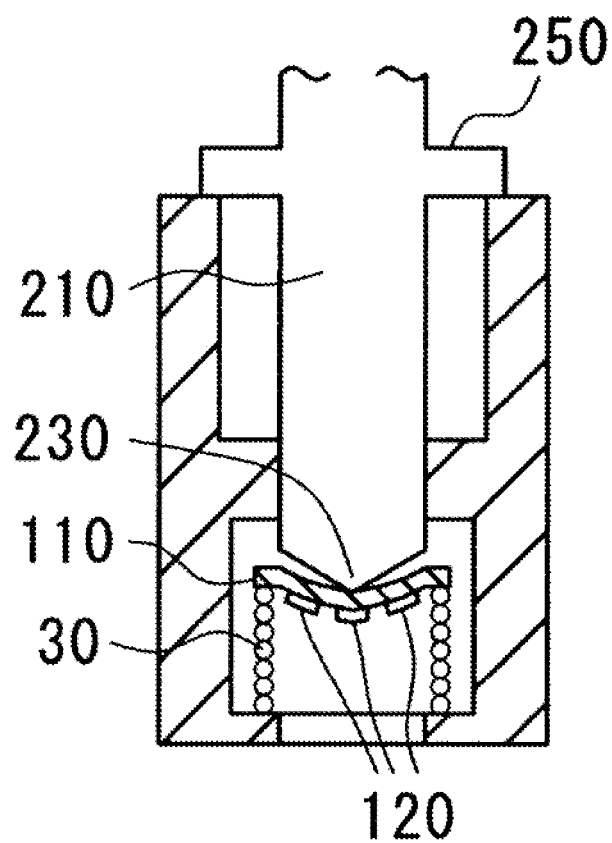

If a pressing force or an impact force for further urging the coil spring 30 is applied, as shown in FIG. 4D, the mechanical stopper 250 provided on the shaft body 210 of the pressing shaft 20 bumps into the circumference of the shaft side opening portion 41 of the support case 40, thereby preventing the pressing shaft 20 from further moving toward the sensor element 10. Therefore, in some cases such as a case where an excessive pressing force considerably exceeding the allowable measurement range of the sensor element 10. or an impact force is applied to the load sensor 1, it is possible to protect the sensor element 10 from the excessive pressing force or the impact force. This state corresponds to a section ($F \geq F_L$) on the right side from $F_L$ in the horizontal axis of FIGS representing the pressing force F.

As described above, in the load sensor 1, the pressing shaft 20, the sensor element 10, and the coil spring 30 are arranged in series, and the shaft body 210 of the pressing shaft 20, the sensor element 10, and the coil spring 30 are accommodated in the support case 40. Further, the sensor element 10 is provided with the thin elastic body 110, and the strain gages 120 attached on the elastic body 110, and the width of each of the above described components in its arrangement direction is very small. Therefore, it is possible to reduce the full length of the load sensor 1. Since the load sensor 1 has the configuration as described above, it is possible to considerably reduce the size and weight of the load sensor as compared to load sensors according to the related art. As a result, it is possible to reduce the size of a target product incorporating the load sensor 1.

Also, since the pressing shaft 20 is supported inside the support case 40 through the two leaf springs 50, the pressing shaft 20 is moved in the axial direction in accordance with a load applied to the pressure receiving portion 220 of the pressing shaft 20, such that the pressing portion 230 of the tip of the pressing shaft is pressed perpendicularly against the one surface of the elastic body 110 of the sensor element 10. As a result, even if the load sensor is pressed from a direction deviating from the axial direction in which a load acts, it is possible to accurately measure the load acting in one axial direction, and excessive stress is prevented from being generated between the strain gages 120 and the elastic body 110 and thus the life of the sensor element is extended, and it is possible to perform accurate load measurement over a long period of time.

Particularly, in a case of reducing the size of the load sensor 1, in order to maintain the output characteristic of the sensor element 10 at a high degree of accuracy, according to the reduction in the size of the load sensor 1, the elastic body 110 of the sensor element 10 needs to be formed so as to have a small diameter and a considerably small thickness. In this case. if the pressing portion 230 of the tip of the pressing shaft presses the elastic body 110 while moving, in an unexpected direction, the elastic body 110 may be damaged. However, in the present embodiment, this problem is prevented due to the above described configuration in which the pressing portion 230 of the tip of the pressing shaft is pressed perpendicularly against the one surface of the elastic body 110 of the sensor element 10.

Also, even under a measurement environment in Which although a load to be measured is small and the allowable measurement range is narrow, the load relative to the pressure receiving portion 220 of the pressing shaft 20 is not constant, and excessive loads considerably exceeding the range of the magnitude of the load to be measured, and impact forces act frequently, the load sensor 1 according to the present invention sufficiently exerts its action. That is, as described above, in a case of reducing the size of the load sensor 1, according to the reduction in the size of the load sensor 1, the elastic body 110 of the sensor element 10 is formed so as to have a small diameter and a considerably small thickness. In this case, if an excessive load or an impact force is applied, at the first stage, the coil spring 30 is deformed in a load range due to the impact or a load corresponding to the excess exceeding the measurement range, and at the second stage, the mechanical stopper 250 bumps into the shaft side opening portion 41 of the support case 40, thereby preventing the pressing shaft 20 from moving. Therefore, it is possible to protect the sensor element 10, and it is possible to perform accurate load measurement over a long period of time.

Since the coil spring 30, which serves as the load limiting means, is deformed in the load range in a case where an impact load or a load exceeding the measurement range is applied, it is possible to perform accurate measurement, and in a case where a load exceeding the measurement range is applied, the coil spring 30 is deformed in the load range, whereby a load corresponding to the excess does not exert adverse influence on the sensor element 10, and thus accurate load measurement is possible over a long period of time.

The load sensor 1 as described above is only shown as an embodiment according to the invention. The shape, material and size of the load sensor 1 and its components may be arbitrary modified without departing from the scope of the present invention.

For example, in the above described embodiment, in order to support the pressing shaft 20 on the support case 40 such that the pressing shaft 20 is movable in the axial direction, the ring-shaped leaf springs 50 are used. However, in place of such ring-shaped leaf springs 50, cantilever-shaped leaf springs having flexibility may be arranged to extend from the inner circumferential surface of the support case at even intervals in the circumferential direction, and the pressing shaft 20 may be fixed to the leading end portions of the cantilever-shaped leaf springs, such that the pressing shaft 20 is supported on the support case 40 so as to be movable in the axial direction.

Also, for example, a linear bearing may be interposed between the pressing shaft 20 and the support case 40, thereby preventing resistance from occurring when the pressing shaft 20 moves in the axial direction.

In the above described embodiment, the elastic body 110 of the sensor element 10 is made of a metal. As long as the sensor element 10 can exert its performance, the kind of the metal is not especially limited and may be an aluminum alloy, stainless steel (SUS), or the like. Alternatively, the elastic body 110 may be formed of a resin exerting elastic force.

In the above described embodiment, plural strain gages 120 are electrically connected to each other so as to form a Wheatstone bridge circuit. However, the load sensor 1 may be configured to have only one strain gage being attached on the center portion of the elastic body 110, and a pressing force may be detected from the distortion amount of the single strain gage.

In the above described embodiment, the sensor element 10 is configured as a distortion sensor which is provided with the strain gages 120 and the elastic body 110. However, the sensor element 10 may be configured by other types of sensors that measures a load by detecting pressing force, sensors such as magnetostrictive sensor, a piezo type pressure sensor, or an electrical capacitance pressure sensor formed in a semiconductor chip form.

Also, in the above described embodiment, the coil spring 30 is used for a member serving as the load limiting means. However, other types of members, such as rubber having appropriate elasticity, bellows, or a sponge having sufficient degree of hardness that is able to serve as the load limiting means, may also be used as a member serving as the load limiting means.

In the above described embodiment, the spring side opening portion 42 and the spring accommodating space 430 are defined by a single component, which is the support case 40, and the inner diameter of the spring side opening portion 42 is set to be smaller than the inner diameter of the spring accommodating space 430. However, the spring side opening portion 42 and the spring accommodating space 430 may be configured to be defined by plural members that form the support case 40 when combined together. By such modification, the sensor element 10 and the coil spring 30 may be inserted into the spring accommodating space 430, and thereafter, another member that configures a part of the support case 40 may be attached to cover the spring accommodating space 430. According to this configuration, assembling of the sensor element 10 and the coil spring 30 into the spring accommodating space 430 may be performed easily without heavily deforming the sensor element 10 and the coil spring 30 when these components are inserted into the spring accommodating space 430

The present invention is not limited to the illustrative embodiment described above but can be embodied by modifying the components without departing from the gist of the invention. Further, various inventions can be made by appropriately combining a plurality of components described in the above illustrative embodiment. For example, some of all components described in the above illustrative embodiment may be removed. Furthermore, the components according to another illustrative embodiment may be appropriately combined.

What is claimed is:

1. A load sensor comprising:
a pressing shaft configured to transmit a load in an axial direction of the pressing shaft;
a sensor element configured to measure the load being transmitted by the pressing shaft;
a load limiting means configured to limit the load applied to the sensor element and protect the sensor element from being applied with excessive load, the load limiting means being configured to be deformable by the load when the load transmitted by the pressing shaft exceeds an allowable measurement range set for the sensor element; and
a support case configured to support the sensor element, the load limiting means, and the pressing shaft in a predetermined arrangement state, and
wherein the pressing shaft is connected to the support case by a support member to be movable in an axial direction of the pressing shaft in response to the load,
wherein the support member is a leaf spring arranged between the support case and the pressing shaft,
wherein the pressing shaft and the support case have grooves to engage with the leaf spring, and the leaf spring is supported by the grooves of the pressing shaft and the support case and
wherein the load limiting means is attached to the sensor element.

2. The load sensor according to claim 1,
wherein the sensor element is provided with an elastic body and a strain gage.

3. The load sensor according to claim 2,
wherein the elastic body is configured to receive the load being transmitted by the pressing shaft and to be deformed in accordance with the received load, and
wherein the strain gage is attached to the elastic body and detects a distortion amount of the elastic body.

4. The load sensor according to claim 1,
wherein the pressing shaft is provided with a mechanical stopper.

5. The load sensor according to claim 4,
wherein the mechanical stopper is formed on the pressing shaft to have a diameter larger than a shaft body of the pressing shaft.

6. The load sensor according to claim 1,
wherein the sensor element is arranged at a position beneath the pressing shaft, and
wherein the load limiting means is arranged at a position beneath the sensor element.

7. A load sensor comprising:
a pressing shaft configured to transmit a load in an axial direction of the pressing shaft;
a sensor element configured to measure the load being transmitted by the pressing shaft;
a load limiting means configured to limit the load applied to the sensor element and protect the sensor element from being applied with excessive load, the load limiting means being configured to be deformable by the load when the load transmitted by the pressing shaft exceeds an allowable measurement range set for the sensor element; and a support case configured to support the sensor element, the load limiting means, and the pressing shaft in a predetermined arrangement state, and wherein the pressing shaft is connected to the support case by a support member to be movable in an axial direction of the pressing shaft in response to the load, wherein the support member is a leaf spring arranged between the support case and the pressing shaft, wherein the pressing shaft and the support case have grooves to engage with the leaf spring, and the leaf spring is supported by the grooves of the pressing shaft and the support case, wherein the sensor element is arranged at a position beneath the pressing shaft, and wherein the load limiting means is arranged at a position beneath the sensor element.

* * * * *